United States Patent
Gwon

(10) Patent No.: US 10,196,212 B1
(45) Date of Patent: Feb. 5, 2019

(54) TABLET DISCHARGE CHUTE

(71) Applicant: SEJONG PHARMATECH CO., LTD., Incheon (KR)

(72) Inventor: Gi Beom Gwon, Incheon (KR)

(73) Assignee: SEJONG PHARMATECH CO., LTD., Incheon (KR)

( * ) Notice: Subject to any disclaimer, the term of this patent is extended or adjusted under 35 U.S.C. 154(b) by 0 days.

(21) Appl. No.: 15/576,802

(22) PCT Filed: Sep. 7, 2017

(86) PCT No.: PCT/KR2017/009786
§ 371 (c)(1),
(2) Date: Nov. 24, 2017

(51) Int. Cl.
*B65G 11/02* (2006.01)
*B65G 11/20* (2006.01)

(52) U.S. Cl.
CPC .......... *B65G 11/203* (2013.01); *B65G 11/023* (2013.01); *B65G 2201/027* (2013.01)

(58) Field of Classification Search
CPC ... B65G 11/023; B65G 11/063; B65G 11/123; B65G 47/71; B65G 47/715
USPC ......... 193/13, 25 A, 23, 29; 198/369.5, 367, 198/369.1, 442, 451
See application file for complete search history.

(56) References Cited

U.S. PATENT DOCUMENTS

| | | | | |
|---|---|---|---|---|
| 2,570,923 A * | 10/1951 | Dodge | .................... | B65B 35/32 193/39 |
| 2,907,443 A * | 10/1959 | Del Rosso | ................ | B07C 1/04 198/442 |
| 6,213,291 B1 * | 4/2001 | Illi | ........................ | B65G 11/123 193/23 |
| 7,665,596 B2 * | 2/2010 | Kolbe | ..................... | B30B 11/08 193/31 A |
| 2011/0233027 A1 * | 9/2011 | Kolbe | ................... | B30B 11/005 193/31 A |

* cited by examiner

*Primary Examiner* — James R Bidwell
(74) *Attorney, Agent, or Firm* — Lucas & Mercanti, LLP

(57) ABSTRACT

Disclosed is a tablet discharge chute including: a channel unit having a main channel into which tablets are inserted and a plurality of discharge channels communicating with the main channel, the discharge channels separating and discharging the tablets; a separation part being coupled to a shaft between the main channel and the discharge channels, the separation part having first and second separation plates that are coupled at a predetermined angle therebetween on the shaft to face the discharge channels; and an actuator being coupled to the shaft and rotating the separation part at a preset angle, wherein when the shaft rotates, the first separation plate lifts the tablets being discharged from the main channel to close a first discharge channel of the discharge channels, and the second separation plate opens a second discharge channel of the discharge channels to guide the lifted tablets to the opened second discharge channel.

8 Claims, 5 Drawing Sheets

TABLET DISCHARGE CHUTE

CROSS-REFERENCE TO RELATED APPLICATIONS

This application is a U.S. national stage of PCT/KR2017/009786, filed Sep. 7, 2017 which claims the priority from Korean Patent Application No. 10-2017-0114066, filed Sep. 6, 2017, the contents of each of which are incorporated herein by reference.

TECHNICAL FIELD

The present invention relates to a tablet discharge chute. More particularly, the present invention relates to a tablet discharge chute that can prevent tablets from being destroyed in a process of discharging tablets received from a tablet press by separating the tablets into normal, damaged, and sample tablets, whereby a defect rate of tablets can be reduced and desired accuracy and speed of tablet separation can be ensured.

BACKGROUND ART

Generally, a tablet classification device for classifying tablets supplied from a tablet press classifies tablets according to a type and stores the tablets in different containers. Also, in most tablet classification devices, tablets are classified in a process of passing through a tablet discharge chute that is a path through which tablets are discharged.

The tablet discharge chute includes a main channel to which tablets are supplied, a plurality of discharge channels separated in parallel from the main channel, and a path switching means provided between the main channel and the plurality of discharge channels, the path switching means switching discharge paths by selectively opening one of the discharge channels such that tablets discharged from the main channel are discharged through the selectively opened discharge channel.

Here, the path switching means is automatically controlled by a controller or a computer, and tablets are classified and discharged by switching paths of the path switching means. The tablets discharged from the discharge channel are assembled in a hopper, and are packaged by a packaging unit provided at a lower portion of a medication packaging device.

However, in the process of switching discharge paths for tablets by the path switching means, tablets are jammed between the channel and the path switching means, and thus the tablets frequently are broken or destroyed. Therefore, there is a high probability of damaged tablets, and the path switching means malfunctions due to the jammed tablets.

DISCLOSURE

Technical Problem

Accordingly, the present invention has been made keeping in mind the above problems occurring in the related art.

An object of the present invention is to provide a tablet discharge chute that can prevent tablets from being destroyed in a process of discharging tablets received from a tablet press by separating the tablets into normal, detective, and sample tablets, whereby desired accuracy and speed of tablet separation can be ensured.

Technical Solution

In order to accomplish the above object, the present invention provides a tablet discharge chute according to an embodiment of the present invention, the tablet discharge chute including: a separation part being coupled to a shaft between a main channel into which tablets are inserted and a plurality of discharge channels that separate and discharge the inserted tablets, wherein when the shaft rotates, the separation part lifts the tablets being discharged from the main channel to close a first discharge channel having been opened, and opens a second discharge channel having been closed to guide the lifted tablets to the opened second discharge channel, whereby discharge paths for the tablets are switched without jamming and destroying the tablets.

According to an embodiment of the present invention, a tablet discharge chute includes: a channel unit having a main channel into which tablets are inserted and a plurality of discharge channels communicating with the main channel, the plurality of discharge channels separating and discharging the inserted tablets; a separation part being coupled to a shaft between the main channel and the plurality of discharge channels, the separation part having first and second separation plates that are coupled at a predetermined angle therebetween on the shaft to face the discharge channels; and an actuator being coupled to the shaft of the separation part and rotating the separation part at a preset angle, wherein when the shaft rotates, the first separation plate lifts the tablets being discharged from the main channel to close a first discharge channel of the discharge channels, and the second separation plate opens a second discharge channel of the discharge channels to guide the lifted tablets to the opened second discharge channel, whereby discharge paths for the tablets are switched without jamming and destroying the tablets.

Here, the first and second separation plates of the separation part may be arranged at an included angle ($\theta$) less than 180° therebetween to face the discharge channels. Preferably, the included angle between the first and second separation plates of the separation part ranges from 120° to 150°.

The actuator may rotate the separation part such that one of the first and second separation plates of the separation part is vertically positioned at a middle between the plurality of discharge channels.

A width of the main channel of the channel unit may be configured to be smaller than a total width of the plurality of discharge channels.

Furthermore, each of intermediate areas between the main channel and the discharge channels may be provided with a guide guiding the inserted tablets to the first separation plate or the second separation plate of the separation part.

The guide may be provided to overlap an end of the first separation plate or an end of the second separation plate by a predetermined portion.

Also, the guide may be provided to be spaced apart from an end of the first separation plate or an end of the second separation plate of the separation part by a preset distance.

Also, the guide may be provided at a slope angle that is equal to a slope angle of the first separation plate in a case where the first discharge channel is closed or a slope angle of the second separation plate in a case where the second discharge channel is closed.

Advantageous Effects

According to the embodiment of the present invention, the first and second separation plates of the separation part for switching discharge paths are arranged at an included angle ($\theta$) less than 180° therebetween to face discharge channels. When the actuator is operated to rotate the separation part, the first separation plate lifts tablets being discharged from the main channel to close the first discharge channel having been opened. Simultaneously, the second separation plate opens the second discharge channel having been closed such that the tablets lifted by the first separation plate are guided to the opened second discharge channel to be discharged. Consequently, tablets can be prevented from being jammed and destroyed between the rotating separation part and the channel, and damaged tablets can be avoided.

Also, jamming of tablets can be avoided, and thus malfunction of the separation part can be avoided, whereby desired accuracy and speed of tablet separation can be ensured.

BEST MODE

Figure 1:
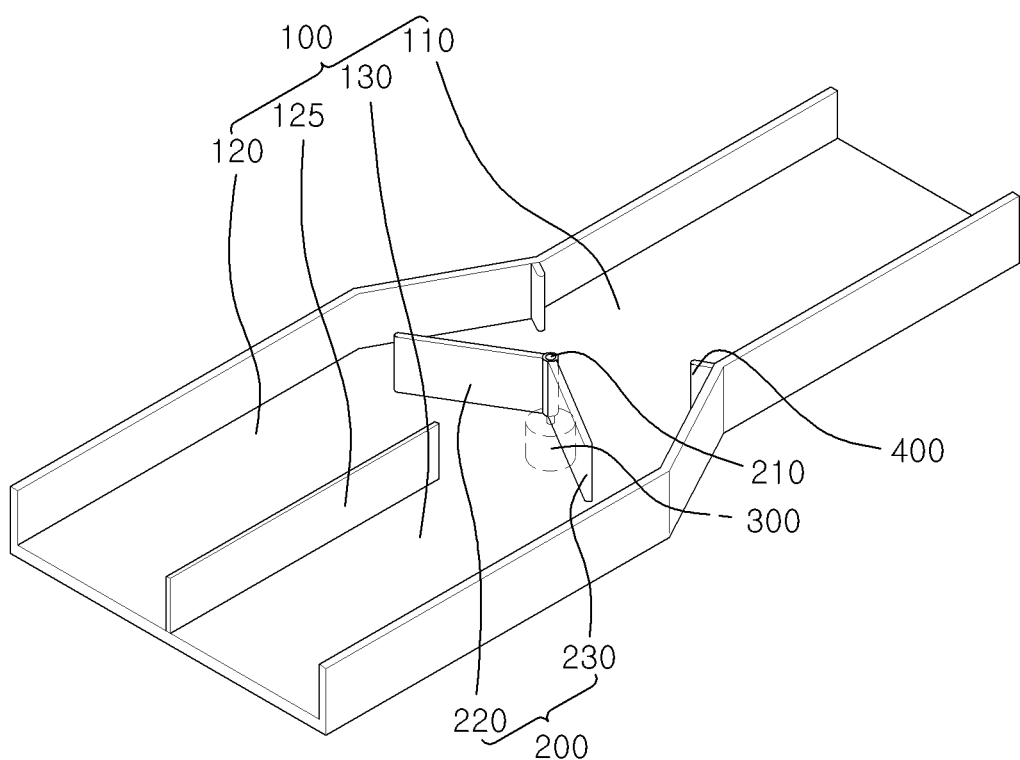
FIG. 1 is a half sectional perspective view illustrating a tablet discharge chute according to an embodiment of the present invention.

Hereinafter, the above and other objects, features and advantages of the present invention will be more clearly understood from the following detailed description taken in conjunction with the accompanying drawings. Hereinafter, a tablet discharge chute according to an embodiment of the present invention will be described in detail with reference to the accompanying drawings. The same reference numerals are used throughout the different drawings to designate the same or similar components, unless specifically mentioned otherwise.

Configurations of a tablet discharge chute according to an embodiment of the present invention will be described with reference to FIGS. 1 and 2, and operation of a separation part will be described with reference to FIGS. 3 to 5.

The tablet discharge chute according to the embodiment of the present invention includes a separation part coupled to a shaft between a main channel into which tablets are inserted and a plurality of discharge channels for separating and discharging the inserted tablets so as to switch discharge paths for tablets. When the shaft rotates, the separation part lifts tablets being discharged from the main channel to close a first discharge channel having been opened. Simultaneously, a second discharge channel having been closed is opened to guide the lifted tablets to the opened second discharge channel. Consequently, discharge paths for tablets are switched without jamming tablets between the separation part and the main channel.

As shown in FIGS. 1 to 5, the tablet discharge chute includes a channel unit 100, a separation part 200, and an actuator 300.

The channel unit 100 includes a main channel 110 formed as one channel into which tablets are inserted and first and second discharge channels 120 and 130 extending in one piece from a lower end of the main channel, the first and second discharge channels separating and discharging the inserted tablets.

Here, the first and second discharge channels 120 and 130 may be provided as a plurality of separate channels communicating with the main channel 110. Alternatively, the first and second discharge channels 120 and 130 may be provided with a partition 125 in a longitudinal direction at the middle therebetween at which the width of the channel unit is enlarged from the lower end of the main channel 110.

Also, the width of the main channel 110 may be equal to the total width of the first and second discharge channels 120 and 130, or as shown in the drawings, the width of the main channel 110 may be formed to be smaller than the total width of the first and second discharge channels. It is desirable that the width of the main channel is equal to the width of each of the first and second discharge channels 120 and 130.

As shown in FIG. 1, between the main channel 110 and the first and second discharge channels 120 and 130, the separation part 200 is coupled to a shaft 210 as being perpendicular to the main channel 110 and the discharge channels 120 and 130. On the shaft 210, first and second separation plates 220 and 230 are coupled at a predetermined angle therebetween.

Figure 2:
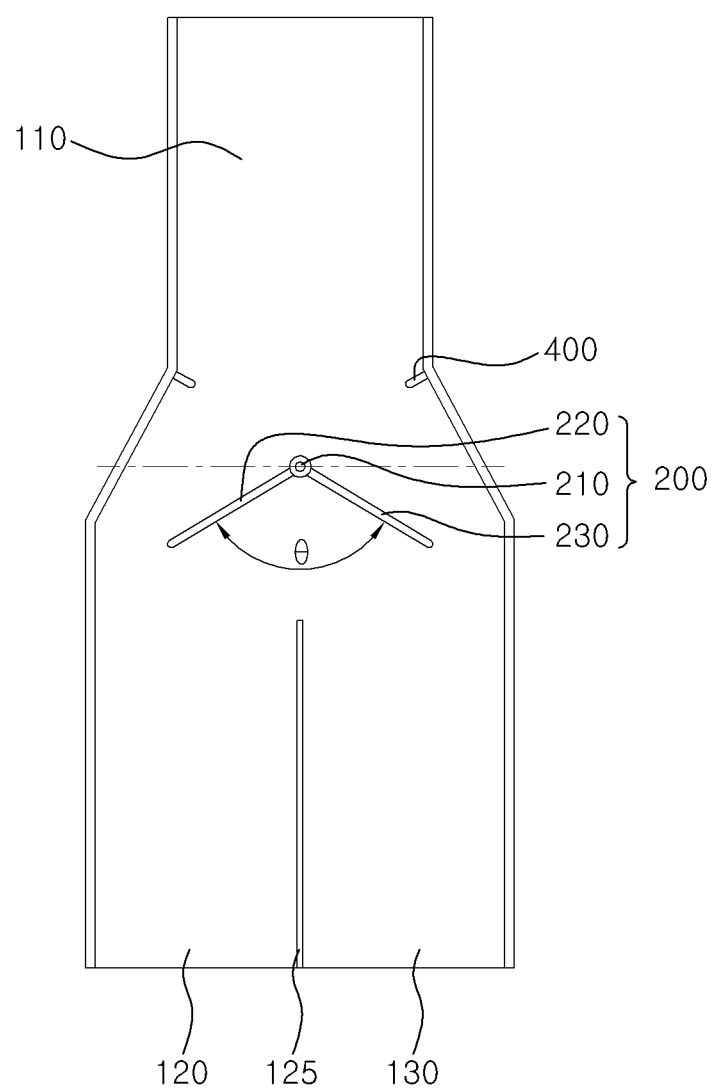
FIG. 2 is a sectional view illustrating a tablet discharge chute according to an embodiment of the present invention.

As shown in FIG. 2, the first and second separation plates 220 and 230 are coupled on the shaft at an included angle ($\theta$) less than 180° therebetween. It is desirable that the first and second separation plates 220 and 230 are provided with the included angle ($\theta$) ranging 120° to 150°. Also, the first and second separation plates 220 and 230 are placed to face the discharge channels 120 and 130.

The actuator 300 is coupled to the shaft of the separation part, and is operated to apply torque to the separation part 200. The actuator 300 is electrically connected to a controller (not shown), and the controller controls the actuator to rotate the separation part at a preset angle.

Furthermore, at an intermediate area between the main channel 110 and the first and second discharge channels 120 and 130, a guide 400 is provided to guide tablets inserted into the main channel 110 to the first separation plate 220 or the second separation plate 230 of the separation part.

Here, the intermediate area between the main channel 110 and the first and second discharge channels 120 and 130 is placed above the central axis 210 of the separation part 200, and thus the guide 400 provided at the intermediate area is placed above the central axis 210 of the separation part 200.

Also, the guide 400 is provided at a slope angle that is equal to a slope angle of the first separation plate 220 in a case where the first discharge channel 120 is closed or to a slope angle of the second separation plate 230 in a case where the second discharge channel 130 is closed.

Also, the guide 400 is provided to overlap an end of the first separation plate 220 or an end of the second separation plate 230 by a predetermined portion. That is, a movement path of tablets sliding on a slope surface of the guide 400 is naturally connected to the first separation plate 220 or the second separation plate 230.

Furthermore, the guide 400 is provided at a location spaced apart from the end of the first separation plate 220 or the end of the second separation plate 220 of the separation part by a preset distance in a longitudinal direction.

The guide 400 is provided to be spaced apart from the first separation plate 220 and the second separation plate 230 because in a case of switching discharge paths, in consequence of a rotation direction of the shaft, the first separation plate 220 or the second separation plate 230 rotates in a direction of lifting tablets being discharged from the main channel 110 such that the first separation plate 220 or the second separation plate 230 becomes close to the guide 400 by being rotated at a preset angle. Here, since tablets on the first separation plate 220 or the second separation plate 230 may be jammed between the guide 400 and the first separation plate 220 or the second separation plate 230, a space between the guide 400 and the first separation plate 220 or the second separation plate 230 is provided such that tablets descend on the slope surface of the first separation plate 220 or the second separation plate 230 and are discharged through the opened discharge path without being jammed between the guide 400 and the first separation plate 220 or the second separation plate 230.

Figure 3:
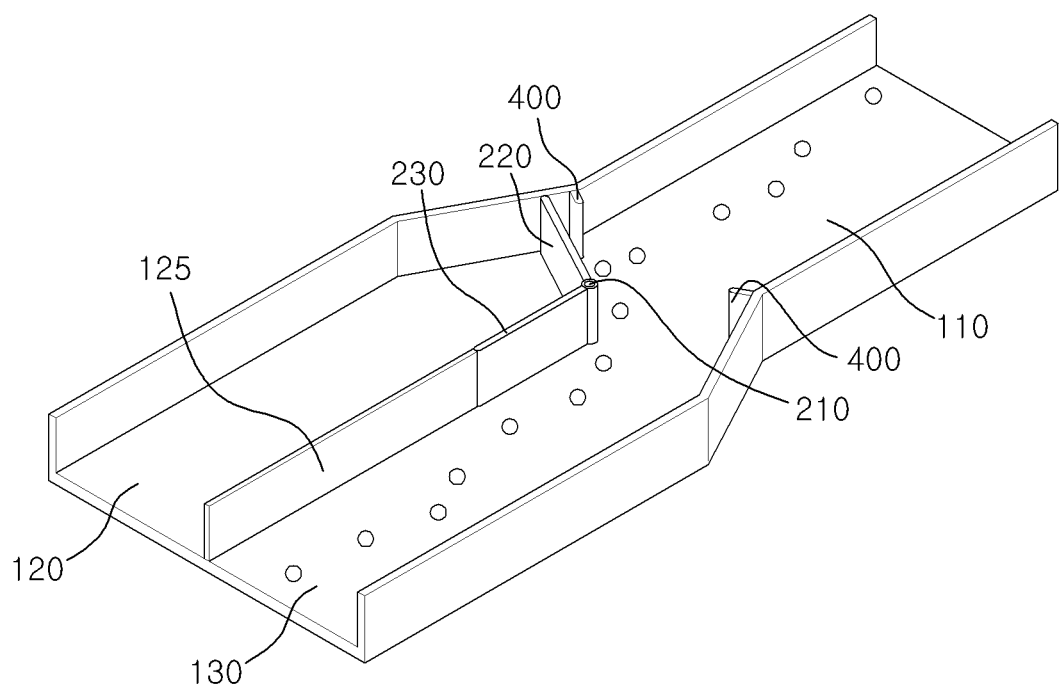
FIG. 3 is a perspective view illustrating operation of a separation part of a tablet discharge chute according to an embodiment of the present invention.
Figure 4:
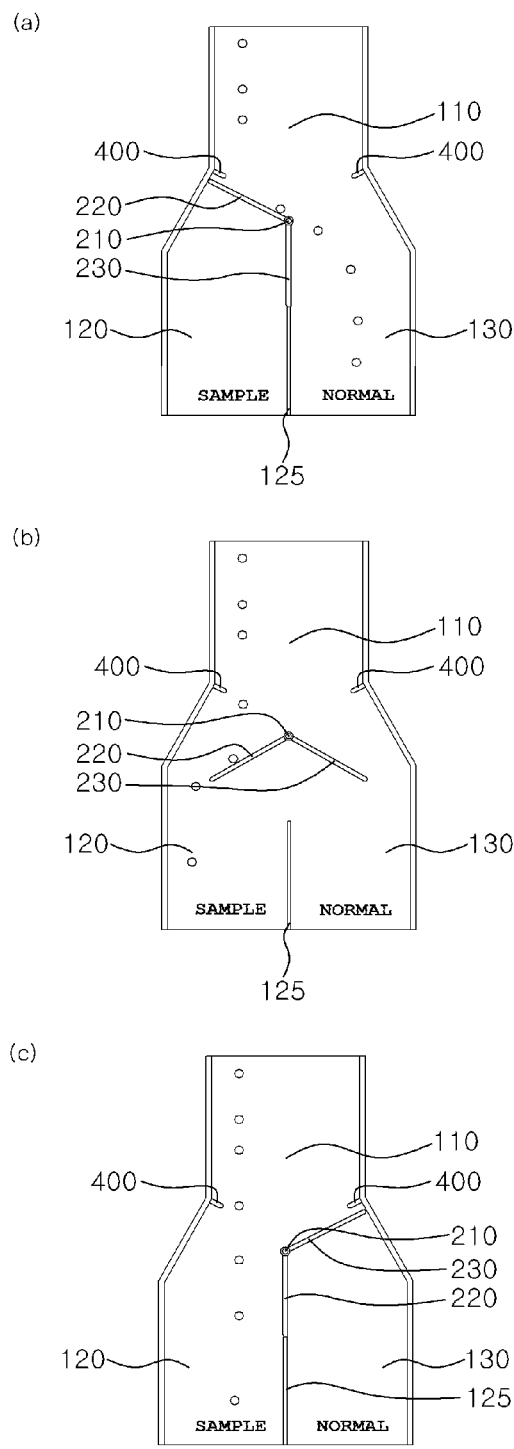
FIGS. 4 and 5 are sectional views illustrating in stages operation of the separation part of FIG. 3.
Figure 5:
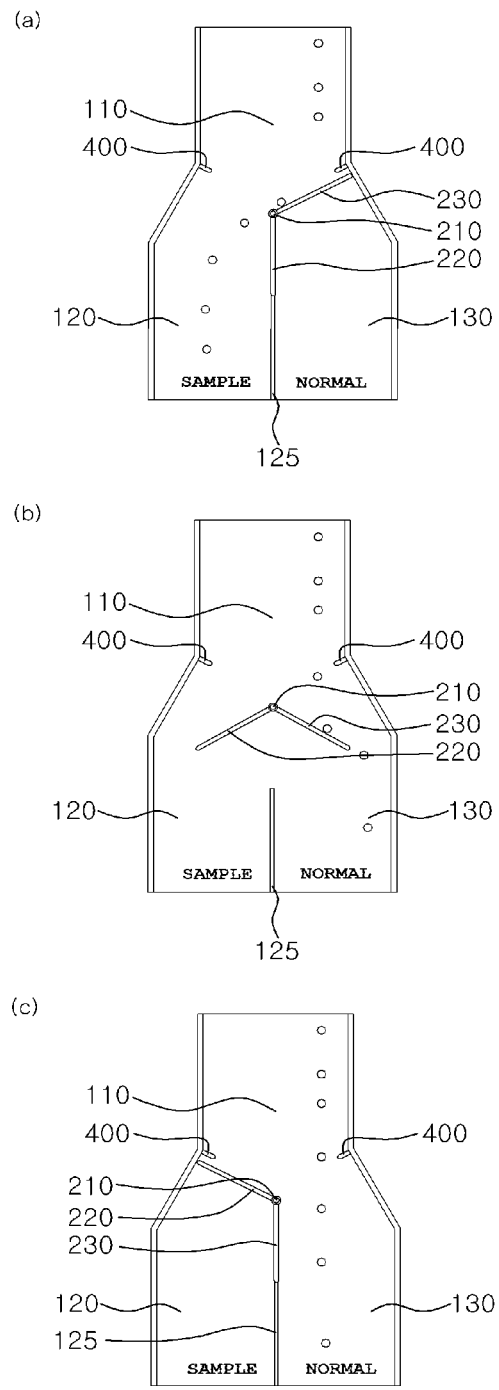

As shown in FIGS. 3 to 5, the tablet discharge chute discharges tablets supplied from a tablet press by separating tablets into normal, damaged, and sample tablets. The accompanying drawings illustrate tablets discharged by separating normal and sample tablets.

As shown in FIGS. 3 and 4(a), the first separation plate 220 of the separation part 200 closes the first discharge channel 120 and the second separation plate 230 is vertically positioned at the middle between the plurality of discharge channels to open the second discharge channel 130. Tablets discharged from the main channel 110 are discharged through a normal tablet discharge path of the opened second discharge channel 130.

As shown in FIGS. 4(b) and (c), in a case of switching discharge paths, when the actuator 300 is operated to rotate the shaft 210, the first separation plate 220 of the separation part rotates toward the discharge channel 120 (state of (b)) and is vertically positioned at the middle between the first and second discharge channel 120 and 130 to open the first discharge channel 120. The second separation plate 230 in cooperation therewith lifts tablets being discharged such that the second discharge channel 130 is closed. Here, tablets on the second separation plate 230 descend on the slope surface of the second separation plate 230, and are discharged through the opened the first discharge channel 120.

Reversely, as shown in FIG. 5(a), the second separation plate 230 of the separation part closes the second discharge channel 130 and the first separation plate 220 is vertically positioned at the middle between the plurality of discharge channels to open the first discharge channel 120. Tablets discharged from the main channel 110 are discharged through a sample tablet discharge path of the opened first discharge channel 120.

As shown in FIGS. 5(b) and (c), in a case of switching discharge paths, when the actuator 300 is operated to rotate the shaft 210, the second separation plate 230 of the separation part rotates toward the discharge channel (state of (b)) and is vertically positioned at the middle between the plurality of discharge channels to open the second discharge channel 130. The first separation plate 220 in cooperation therewith lifts tablets being discharged such that the first discharge channel 120 is closed. Here, tablets on the first separation plate 220 descend on the slope surface of the first separation plate 220, and are discharged through the opened second discharge channel 130.

As described above, according to the present invention, the first and second separation plates of the separation part for switching discharge paths are arranged at the included angle (θ) less than 180° therebetween to face the discharge channels. When the actuator is operated to rotate the separation part, the first discharge channel having been opened is closed by lifting tablets being discharged from the main channel. Simultaneously, the second discharge channel having been closed is opened to guide the lifted tablets to the opened second discharge channel. Consequently, tablets can be prevented from being jammed and destroyed such that malfunction of the separation part can be avoided, whereby desired accuracy and speed of tablet separation can be ensured.

Although the preferred embodiments of the present invention have been disclosed, the present invention is not limited to the aforementioned particular embodiments. That is, those skilled in the art will appreciate that various modifications and changes are possible, without departing from the scope and spirit of the present invention as disclosed in the accompanying claims. Therefore, all suitable modifications, changes, and equivalents thereof should be interpreted as being included in the scope of the present invention.

INDUSTRIAL APPLICABILITY

The present invention may be extensively used in various types of a tablet discharge chute.

The invention claimed is:
1. A tablet discharge chute comprising:
a channel unit including a main channel into which tablets are inserted and a plurality of discharge channels communicating with the main channel, the plurality of discharge channels separating and discharging the inserted tablets;
a separation part being coupled to a shaft between the main channel and the plurality of discharge channels, the separation part including first and second separation plates that are coupled at a predetermined angle therebetween on the shaft to face the discharge channels; and
an actuator being coupled to the shaft of the separation part and rotating the separation part at a preset angle,
wherein when the shaft rotates, the first separation plate lifts the tablets being discharged from the main channel to close a first discharge channel of the discharge channels, and the second separation plate opens a second discharge channel of the discharge channels to guide the lifted tablets to the opened second discharge channel, whereby discharge paths for the tablets are switched without jamming and destroying the tablets,
wherein the first and second separation plates of the separation part are arranged at an included angle (θ) less than 180° therebetween to face the discharge channels.

2. The tablet discharge chute of claim 1, wherein the included angle between the first and second separation plates of the separation part ranges from 120° to 150°.

3. The tablet discharge chute of claim 1, wherein the actuator rotates the separation part such that one of the first and second separation plates of the separation part is vertically positioned at a middle between the plurality of discharge channels.

4. The tablet discharge chute of claim 1, wherein a width of the main channel of the channel unit is configured to be smaller than a total width of the plurality of discharge channels.

5. The tablet discharge chute of claim 1, wherein each of intermediate areas between the main channel and the discharge channels is provided with a guide guiding the inserted tablets to the first separation plate or the second separation plate of the separation part.

6. The tablet discharge chute of claim 5, wherein the guide is provided to overlap an end of the first separation plate or an end of the second separation plate by a predetermined portion.

7. The tablet discharge chute of claim 5, wherein the guide is provided to be spaced apart from an end of the first separation plate or an end of the second separation plate of the separation part by a preset distance.

8. The tablet discharge chute of claim 5, wherein the guide is provided at a slope angle that is equal to a slope angle of the first separation plate in a case where the first discharge channel is closed or a slope angle of the second separation plate in a case where the second discharge channel is closed.

* * * * *